March 23, 1965     K. RÄNTSCH     3,174,392
NONCONTACTING LINEAR DIMENSION OPTICAL MEASURING DEVICE
Filed Feb. 23, 1960     3 Sheets-Sheet 3

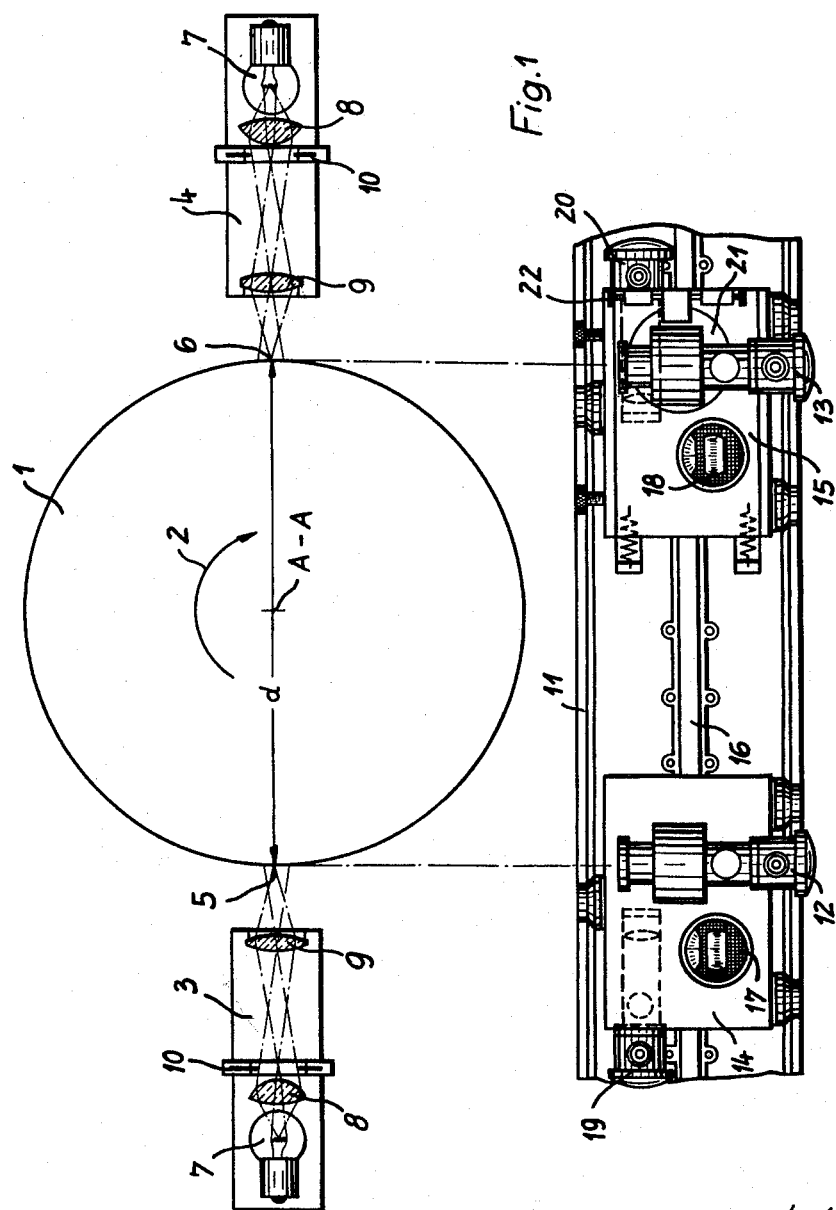

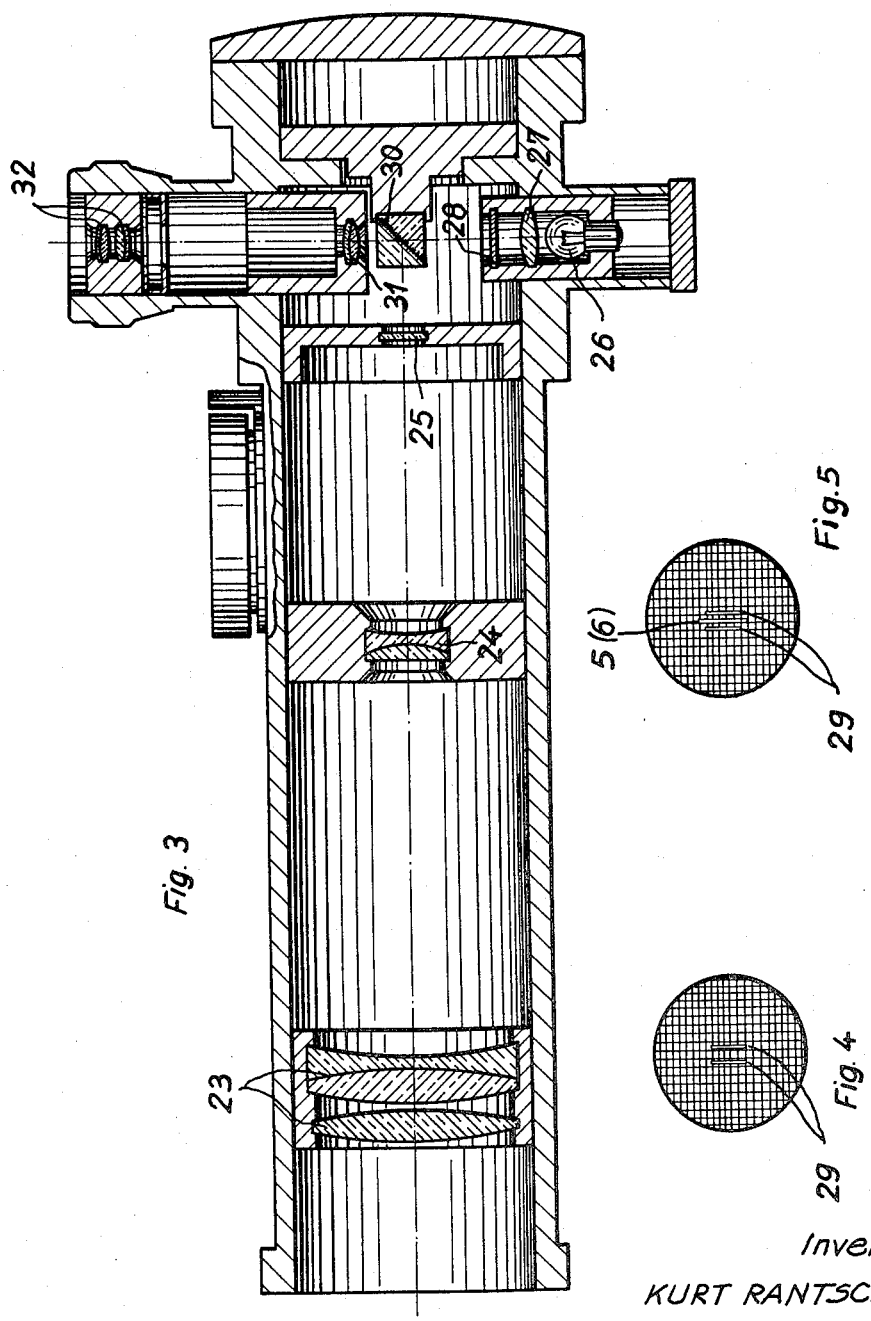

Inventor
KURT RANTSCH

By Toulmin & Toulmin
Attorneys

United States Patent Office 3,174,392
Patented Mar. 23, 1965

3,174,392
NONCONTACTING LINEAR DIMENSION OPTICAL MEASURING DEVICE
Kurt Räntsch, Wetzlar, Germany, assignor to M. Hensoldt & Söhne, Optische Werke Aktiengesellschaft, Wetzlar (Lahn), Germany
Filed Feb. 23, 1960, Ser. No. 10,203
Claims priority, application Germany, Feb. 26, 1959, H 35,735
4 Claims. (Cl. 88—14)

The present invention relates to an optical measuring apparatus and, more in particular, to an optical measuring apparatus for measuring the diameter of large work pieces.

It is known in the art to provide optical measuring apparatus for measuring the diameter of large work pieces, comprising a pair of telescopic sights displaceable on a common guide and having a pair of measuring marks which can be aimed at the two end points of the diameter of the work piece. The displacement of the telescopic sights can be read on a scale, so as to indicate the length of the diameter. This measuring apparatus can be used, however, only for measuring the diameter of stationary work pieces, but cannot be used if the work piece is moving, for example rotating, because then the reference marks are removed from the aiming position.

According to another apparatus, known in the art, a light ray is emitted towards the work piece, comes into contact with the surface of the latter and is viewed in a microscope. Interference strips are thus produced, the positions of which can be determined by means of a reference mark. Thereafter, the apparatus is displaced until the reference mark on the other end of the work piece receives the same interference strips. The displacement indicates the desired value of the diameter. This apparatus suffers from the disadvantage of being complicated and time-consuming in operation. In addition, it cannot be used for measuring the diameter of work pieces having specular surfaces or semi-specular surfaces.

It will be easily apparent that it is highly desirable to provide an apparatus, enabling the measuring of the diameter of large work pieces while the same are in motion, for example while they are rotating, in the process of working the piece of material on a machine tool.

It is, therefore, the object of the present invention to provide an improved measuring apparatus for determining the diameter of large work pieces, which is applicable to the measuring of both stationary and moving work pieces.

It is another object of the present invention to provide an improved measuring apparatus for determining the diameter of large work pieces which can be used for effecting the measurement of work pieces having specular or semi-specular surfaces.

These objects as well as further objects and advantages of the present invention, which will become apparent as the description thereof proceeds, are accomplished by the optical measuring apparatus comprising, in addition to a pair of telescopic sights displaceable on a guide, and a scale from which the displacement of the telescopic sights can be read, a reference mark and projecting means for projecting said reference mark in the direction of the diameter of the work piece onto the two end points of the diameter of the work piece. The reference marks as projected can be viewed with the two telescopic sights. In case of a rotating work piece the position of the two reference marks is not changed as long as the diameter remains the same.

Preferably, light bands are used as reference marks and a diaphragm is provided, allowing for the variation of the respective widths and light intensities of the light bands.

It will be found to be of particular advantage to equip each telescopic sight with a pair of light marks, serving as reference means for determining and adjusting the positions of the light bands. Preferably, each of the light marks in each of the telescopes have the form of double-stroke reference marks.

According to a preferred embodiment of the invention means are provided for controlling the parallel arrangement of the respective optical axes of the telescopic sights. These means may comprise, for example, a pentaprism disposed in front of one of the telescopic sights. The pentaprism has a wedge-shaped portion, giving it a plane-parallel configuration, with the same transparent, specular layer interposed between the pentaprism body proper and the wedge-shaped portion. This pentaprism arrangement makes it possible to simultaneously view the reference marks, for example the light bands projected onto the diameter end point of the work piece, and the reference mark of a collimator associated with the other of the two telescopic sights.

The invention will be more fully appreciated upon the following detailed description of the accompanying drawings, wherein FIGURE 1 is a top view of the optical measuring apparatus of the present invention;

FIGURE 3 is a longitudinally sectional view of a telescopic sight used in the apparatus of the invention shown in FIGURES 1 and 2;

FIGURE 4 is a plan view of a graticule of the telescopic sight of FIGURE 3;

FIGURE 5 is a plan view of the field of view of the telescopic sight shown in FIGURE 3;

Figure 2:
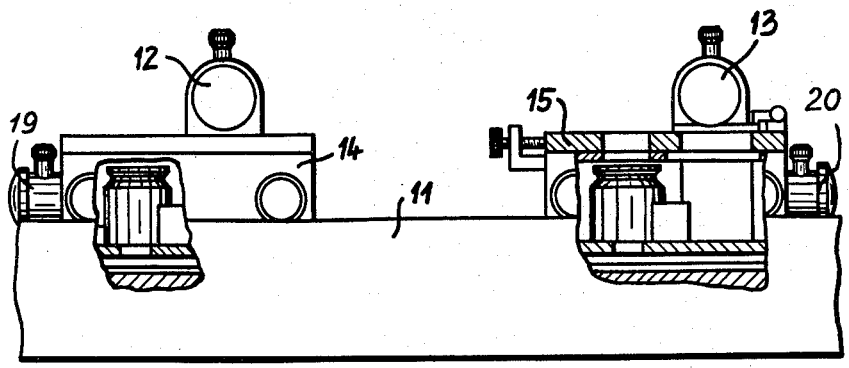
FIGURE 2 is a front view of the apparatus shown in FIGURE 1.

Referring now to the drawings more in detail and turning first to FIGURE 1, the drawing shows a work piece 1 disposed on a rotary platen or turn-table (not shown), so as to be rotatable about axis A—A in the direction indicated by arrow 2. The purpose of the measuring apparatus of the invention is to measure and currently control the diameter $d$ of work piece 1.

The apparatus of the invention comprises two projection units 3 and 4, projecting light bands 5 and 6 onto the respective end points of the diameter of work piece 1. Each projecting unit has a housing containing a light source 7, lenses 8 and 9, and between lenses 8 and 9 an adjustable diaphragm 10. By adjusting diaphragm 10 the widths of the light bands can be varied.

The apparatus further comprises telescopic sights 12 and 13 mounted on carriages 14 and 15, which latter are slideably positioned on a guide 11. A scale 16 is fixedly connected with guide 11. One of the two telescopic sights 12 and 13, which are identical, is shown in FIGURE 3. The telescopic sight has a a housing in which there are disposed, at the same optical axis, lenses 23 and 24, a plate 25 and a dividing prism 30. Rectangularly relative to the optical axis of the aforementioned elements are provided eye-piece lenses 31 and 32 at one side of dividing prism 30 and, at the opposite side of dividing prism 30, a graticule 28, a condenser lens 27 and a light source 26. The graticule 28 is provided with two division marks 29, as shown in FIGURE 4.

The apparatus of the invention further is equipped with means for controlling the parallel arrangement of the lines of sight of telescopes 12 and 13, comprising a collimator 19, mounted on carriage 14, and a further telescopic sight 20, supported by carriage 15. The telescope sight 20 and the telescopic sight 13 are mounted on a disk 21 which can be rotated by turning an adjusting screw 22.

The operation is as follows: The two projecting units 3 and 4 project light bands 5 and 6 onto the respective end points of the diameter $d$ of work piece 1. The light bands 5 and 6, the widths of which can be varied by the adjustable diaphragm 10, are viewed through the telescopic sights 12 and 13 and they appear in the respective fields of view of the two telescopic sights as a narrow linear mark, as will be seen in FIGURE 5.

The image of the bands in the telescopic sights is produced by lenses 23 and 24 projecting an image of light bands 5 or 6, respectively, on plate 25. At the same time, light source 26 illuminates, via condenser lens 27, graticule 28 with the two linear division marks 29. The images of plate 25 and graticule 28 are superimposed by dividing prism 30 and can then be viewed through eye piece lenses 31 and 32. In order to measure the diameter of work piece 1, carriages 14 and 15 are displaced until the images of the light bands 5 and 6, appearing as a narrow linear division mark in the field of view of the telescopic sights 12 and 13, are accurately positioned in the center between the division marks 29 (see FIGURE 5). The amount of the displacement of carriages 14 and 15 can be read from scale 16 through reading devices 17 and 18.

The parallel arrangement of the respective lines of sight of telescopes 12 and 13 is controlled before each measurement, that is after each displacement of carriages 14 and 15 in the following manner: The disk 21 is rotated by means of screw 22 until the telescopic sight 20 shows, in its field of view, the reference mark of collimator 19. As soon as the reference mark appears in the field of view of telescopic sight 20, the respective lines of sight of the telescopic sights 12 and 13 are positioned parallel relative to each other.

Figure 6:
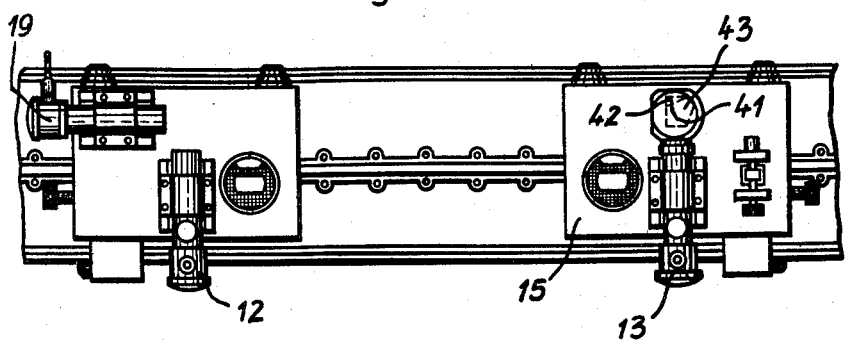
FIGURE 6 is a top view of another embodiment of the optical measuring apparatus of the invention.
Figure 7:
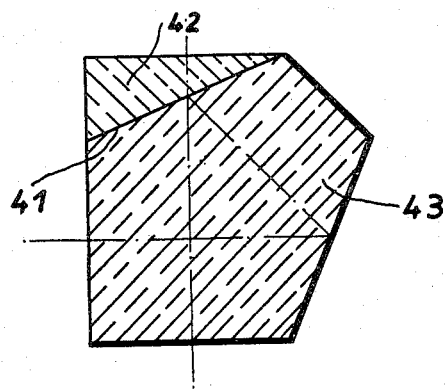
FIGURE 7 is a view of the prism of FIG. 6.

Another embodiment of the invention is shown in FIGURES 6 and 7 according to this embodiment of the invention a pentaprism 43 is provided in front of telescopic sight 13. The pentaprism 43 has an attached wedge element 42, with an intermediate semitransparent specular layer 41, so as to have a plane-parallel configuration in the direction towards telescopic sight 13.

The light rays coming from collimator 19 are directed by pentaprism 43 towards the telescopic sight 13. At the same time light mark 6 can be viewed with telescopic sight 13. It is thus possible to control at one glance the correct displacement of carriage 15 and the parallel arrangement of the lines of sights of telescopes 12 and 13.

It will be understood that this invention is susceptible to modification in order to adapt it to different usages and conditions and, accordingly, it is desired to comprehend such modifications within this invention as may fall within the scope of the appended claims.

What I claim is:
1. Optical apparatus for measuring the diameters of workpieces comprising, in combination, a pair of telescopic sights having parallel optical axes, guide means for said telescopic sights, means for rendering said telescopic sights displaceable on said guide means in a direction transverse to said axes so that said axes are respectively in tangential relation to two end points of a diameter of the workpiece, scale means associated with said guide means between and at right angles to the telescopic sights, wherefrom the displacement of said telescopic sights on said guide means can be read, a first and a second light projecting unit disposed at opposite sides of the workpiece for projecting reference marks in the direction of said diameter of the workpiece onto said two end points of said diameter of the workpiece, and a first and a second adjustable diaphragm associated with said first and said second projecting unit, respectively, for adjusting the width of projected reference marks in direction of said axes, and said telescopic sights being adjustable on said guide means to place the reference marks in alignment with the optical axis of the respective telescopic sights, whereby the workpiece can rotate during measurement, means for projecting a first and a second pair of parallel light marks into the range of vision of said telescopic sights, respectively, as a reference means for determining and adjusting the positions of the light bands produced by said projecting units in cooperation with said adjustable diaphragms.

2. Optical apparatus according to claim 1, further comprising control means for adjusting the parallelism of said optical axes of said telescopic sights comprising a collimator secured to said first telescopic sight, and disposed in front thereof, transmitting a light beam transversely to said axes, pentaprism means disposed in front of said second sight and having a wedge-shaped portion giving the pentaprism a plane-parallel configuration, and a semitransparent, specular layer between said pentaprism and said wedge-shaped portion, said pentaprism having a first surface disposed transversely to the optical path and axis of said second sight, a second surface disposed in the path of said light beam transversely thereto, a third surface inclined by an angle with respect to said first surface, said semi-transparent layer covering a fourth surface being inclined by the same angle with respect to said second surface.

3. Optical apparatus as set forth in claim 1, further comprising, projecting means secured to said first telescopic sight projecting a light reference mark in a direction parallel to said direction of displacement; a light path combining means disposed in the projecting path of said reference mark as well as in the range of observation of said second telescopic sight.

4. Optical apparatus for measuring the diameters of workpieces comprising, in combination, a first and a second telescopic sight having parallel optical axes, guide means for said telescopic sights, means for rendering said telescopic sights displaceable on said guide means transversely with respect to said axes, so that said axes are respectively in tangential relation to two end points of a diameter of the workpiece, scale means associated with said guide means between and at right angles to the telescopic sights wherefrom the displacement of said telescopic sights on said guide means can be read, and two projecting means for individually projecting two illuminating reference marks in directions perpendicular to said axes, onto said two end points of said diameter of the workpiece, control means for controlling the parallel arrangement of the respective optical axes of said telescopic sights, said control means comprising, a collimator having a reference mark and being secured to said first telescopic sight, a third telescope for viewing said reference mark being secured to said second telescopic sight, and a plate rotatably mounted in guide means, carrying said second telescopic sight and said third telescope.

References Cited by the Examiner
UNITED STATES PATENTS

| | | | |
|---|---|---|---|
| 1,959,537 | 5/34 | Kuhne | 88—14 |
| 2,144,257 | 1/39 | Eppenstein | 88—2.7 |
| 2,607,267 | 8/52 | Fultz et al. | 88—14 |
| 2,709,944 | 6/55 | Marx | 88—14 |

FOREIGN PATENTS 608,505  1/35  Germany.

JEWELL H. PEDERSEN, *Primary Examiner.*
EMIL G. ANDERSON, *Examiner.*